INVENTORS
François Meauzé
AND
Valentino Niguel
BY Michael A. Striker
ATTORNEY

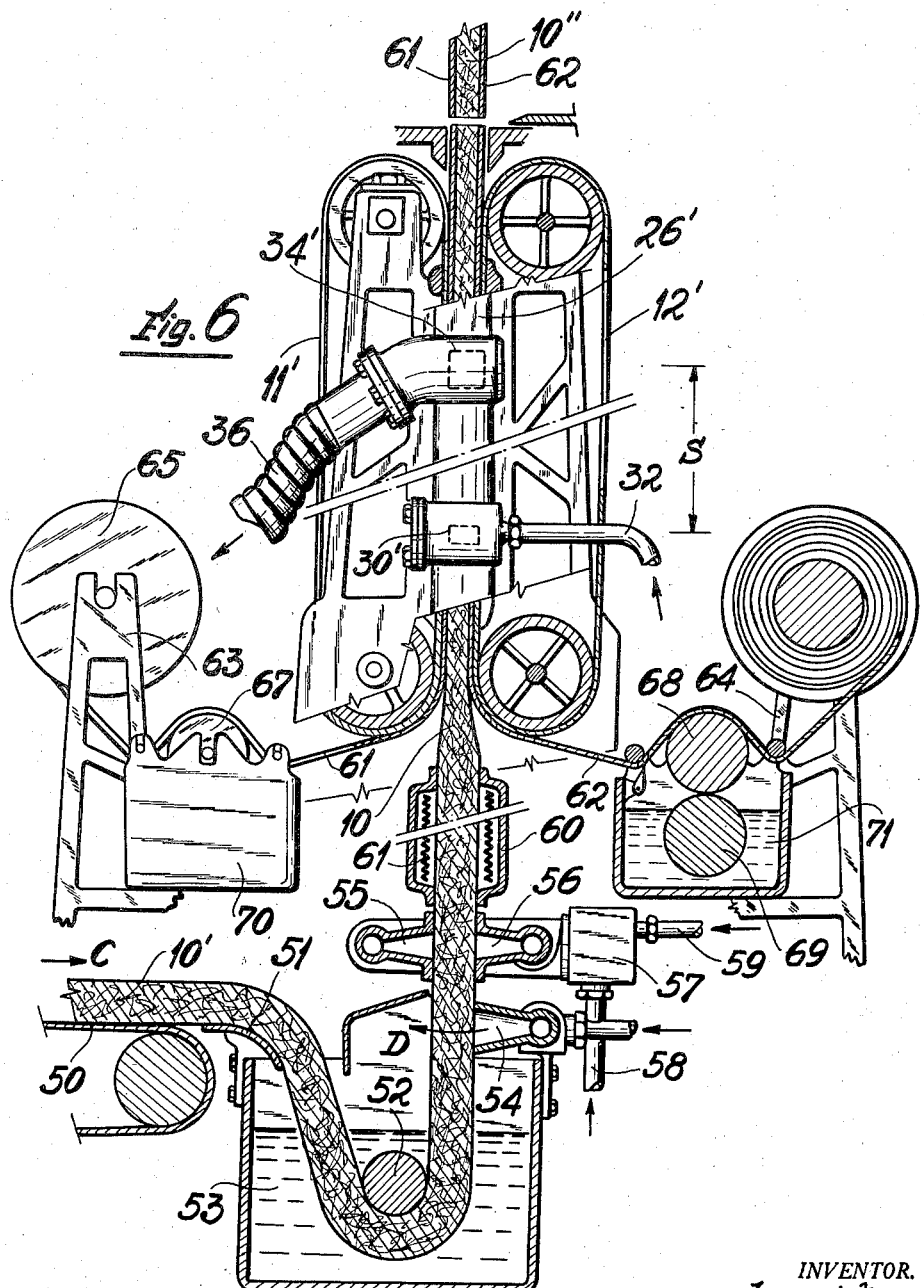

United States Patent Office 2,826,236
Patented Mar. 11, 1958

2,826,236

METHOD AND APPARATUS FOR UNINTERRUPTED PRODUCTION OF SURFACE COATED LAYERS OF BONDED MINERAL WOOL

François Meauzé, Milan, and Valentino Wiquel, Besana Brianza, Italy, assignors to Vetreria Italiana Balzaretti Modigliani S. p. A., Milan, Italy, an Italian company Application May 25, 1955, Serial No. 511,094

Claims priority, application Italy May 29, 1954

14 Claims. (Cl. 154—1)

The present invention relates to a method for uninterrupted or continuous production of a layer of bonded mineral wool, or more particularly a fiber glass wool layer, combined with a binding agent, and for treating said layer for having the major surfaces thereof coated or hardened, by making use of same binding agent and/or other material or materials, to produce a strong, self-sustaining rigid or semi-rigid mass in form of panels, plates and the like, wherein a fibrous core portion of mineral wool is made integral with harder and eventually impervious surface portions.

The present invention relates further to an improved apparatus or plant capable of large uninterrupted production of a layer of the character referred to above, by applying the method of the invention.

More particularly, the main object of this invention is to provide a new and highly advantageous method whereby a continuous mat or layer of mineral wool, say of fiber glass wool or of like fibrous light material including a binding agent may be treated by continuous and relatively fast passage of said mat or layer in and through a particular apparatus (described below), the treatment comprising the steps of applying heat and pressure in the interior of said mat or layer, and of causing said binding agent to form or to co-operate with other material or materials to form surface portions of different and prevailingly of harder consistency, made by condensing same binding agent at the major surfaces of said mat, and eventually by making said mat integral at its major surfaces or at one of its major surfaces with other material or materials in sheet or panel form.

A more specific object of this invention is to provide a new and improved method for the treatments referred to above and comprising the use of a gaseous medium, say of overheated steam under pressure, as heat and pressure carrier, and the steps of causing the said gaseous medium to flow into a length of the fibrous material, means being provided to prevent said gaseous medium to pass through the major faces of said material.

Therefore, another object of this invention is to provide, in an apparatus for continuously treating a mat or a layer of the type and for the production referred to above, guide means having two major oppositely located guide faces adapted to confine portions of the major surfaces of said layer, other two minor or edge guide faces adapted to confine portions of the edge or side surfaces of same layer at same length portion thereof, means for continuously moving the said continuous layer in one direction within the said guide means, means for making the said major guide faces impervious to said gaseous medium, at least one inlet means opening on at least one of said minor guide faces for blowing a stream of a gaseous medium into the said layer, and at least one outlet opening means on at least one of said minor guide faces for receiving the said stream of gaseous medium after the same has passed through a substantial portion of the layer confined between said major impervious made guide faces.

A further object of this invention is to provide a new and improved method as above whereby the pressure and the heat are applied to the fibrous layer material wherein a binding agent in particular of the thermo-setting type, causing the gaseous heat and pressure carrier medium to expand into a substantially extended portion of the layer and to act during a substantial time therein for having the said binding dried and polymerized while the said layer is moved in one direction at a substantial speed, in view of large uninterrupted production of surface coated layers.

A still further object of this invention is to provide a method as above, whereby a continuous or interrupted sheet or panel shaped material or materials is or respectively are produced or applied on one major surface or on both the major surfaces of the mineral wool layer comprising a binding agent and made integral with said layer at its said one or both major surfaces, in view of manufacture of a novel and highly useful compound material consisting in an inner or core portion of fibrous and porous material and in one or two surface portions of more consistent material or character.

In particular, by making use of the method according to the invention a plurality of new and highly advantageous materials may be mass produced, said new materials being provided with impervious, and/or heat or flame resisting, and/or very hard, and/or very smooth, and/or decorative surface portion or portions. Said new material may be made use of for building up external or partition walls, insulating ceilings, floor boards, and in any other case wherein a more or less thick lightweight and sound and/or heat insulating stratum having harder surface portions might be convenient or desirable.

Another object of this invention is therefore the provision of a new and improved apparatus or plant adapted to the above said kind of mass production, wherein a continuous mat or layer of fibrous material, say of fiber glass wool, may be continuously moved in one direction, wherein one or more binding agents may be applied to any fiber thereof, wherein one or more other layers, or sheets, or panels of differing materials may be also moved in same direction and speed than the said mat or layer in contacting relationship with the major faces thereof, and wherein the said gaseous medium is forced to travel inside the said fibrous material for exerting an heating and pressurizing action adapted to dry and polymerize the said binding agent and for exerting a mechanical action adapted to condense a part of said agent on the inner faces of said differing materials and on the fibers adjacent thereto, for having said differing materials made integral with the said fibrous mat or layer at its major faces, in view of manufacture of the desired said new and advantageous compound material.

Having the above objects and conditions in mind, in a preferred form of embodiment of this invention we provide a method comprising the steps of saturating the said layer with a thermo-setting binding agent; of continuously moving said layer in one direction in a guide passage of substantial length, the said layer having two oppositely located major faces (forming the "surfaces") and to two oppositely located minor faces (forming the "edges") of the layer, and the said guide passage having a rectangular cross-sectional shape corresponding to the cross-sectional shape of the material to be produced and generally of width and in particular of thickness less than the corresponding dimensions of said layer; of making impervious to gases the guide faces comprised in said guide passage and designed to contact and to guide the said major faces of the layer; of blowing within the said layer a stream of gaseous medium of given pressure and temperature, in direction substantially parallel to the said major faces and at first inlet points located on the other guide faces of said guide passage, designed to contact and to guide the minor faces or edges of said layer; of receiving said stream from the interior of said layer at second outlet points located on the said other guide faces and spaced from the said first points in longitudinal direction of said layer, the relative arrangement of said inlet and outlet points being adapted to have the said gaseous medium exhausted from the said layer after the said gaseous medium has travelled substantially parallel to said major faces through both a longitudinal section and a transverse section of the said layer of fibrous material, while it has been prevented to pass through the major faces thereof; and of generating gaseous movements, heat and pressure in an at least substantial part of the portions travelled by said gaseous medium, certain conditions in the said layer adapted to distribute and disperse the said binding agent in the thickness of said fibrous material for having same agent set at any point of said material and prevailingly condensed at and near the major faces thereof.

Preferably, in the practical embodiment of this invention the said fibrous layer is continuously moved in the said guide passage by means of oppositely arranged and operating conveyor bands, the said conveyor bands being made of impervious material or co-operating with impervious material to prevent the said gaseous medium to escape from said layer at any point of the major surfaces thereof. In the case that sheet or panel materials of impervious character are arranged to contact the surfaces of the fibrous layer for making same integral therewith, according to the invention, the required imperviousness of the major faces may be obtained by making use of same materials.

In the specific form of embodiment of the invention, whereby a compound material is produced, and wherein the said compound material consists in an inner or core portion of mineral wool, say of fiber glass wool, and in surface portion of differing materials not homogeneous to the said fibrous material, two or more differing binding agents may be applied, means being provided for independent application of said agents to the mineral wool and to the said differing materials, the said several materials and binding agents being simultaneously subjected to heat and pressure in the said guide passage for setting same.

Further, in the specific case that differing and not homogeneous binding agents requiring differing time and/or heat conditions for having same set are applied, means may be provided for a prior partial heating of the various materials prior to carry same in contacting relationship within the said guide passage, for having a partial preliminary treatment adapted to put the not homogeneous elements at a such condition that the simultaneous final treatment within the said guide passage might complete the setting of the various agents.

The novel features which are considered as characteristic for the invention are set forth in particular in the appended claims. The invention itself, however, both as to its construction and its method of operation, together with additional objects and advantages thereof, will be best understood from the following detailed description of specific embodiments thereof when read with reference to the accompanying drawings, forming an essential component of this disclosure. In the said drawings, the several merely structural details of the various constructions are omitted, in consideration of the fact that details may be easily imagined by those skilled in the art to which this invention appertains, and that said details do not constitute characteristic of the invention and belong to common knowledge of the art.

Further, a plurality of structural feature not forming part of the matter claimed as new in this invention, but which may be advantageously made use of for carrying out same for uninterrupted mass production of panels of fibrous material, of fiber glass wool for example, may be found and acknowledged in and by our prior U. S. Patent No. 2,698,260, and in and by the disclosure and drawings of our co-pending application Serial Number 461,576, filed on October 11, 1954, for an "Apparatus for Treating a Layer of Fibrous Material." In the specifications and drawings of said patent and co-pending patent application various apparatuses, plants and devices adapted to the continuous manufacture of an elongated band-shaped layer of fibrous material wherein the fibers thereof are bonded by a thermo-setting binding agent are fully made known, together with its mode of operation. The matter made known in and by the said descriptions and drawings may be made use of for best understanding of the matter considered as this specification proceeds, in the part related to the treatment of the inner or core portion of the material to be produced according to this invention.

Figure 1:
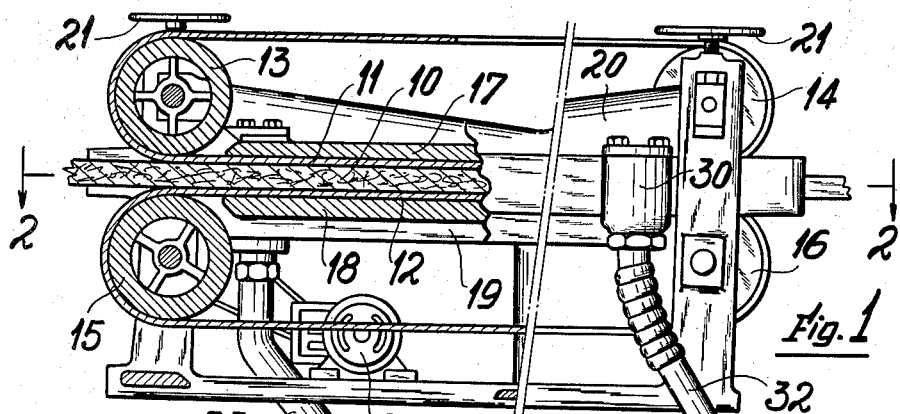
Figure 1 shows in a rather simplified way, partly in side elevation and partly in vertical section, in the plane and in directions 1—1 of Fig. 2, an apparatus constructed according to the invention.
Figure 2:
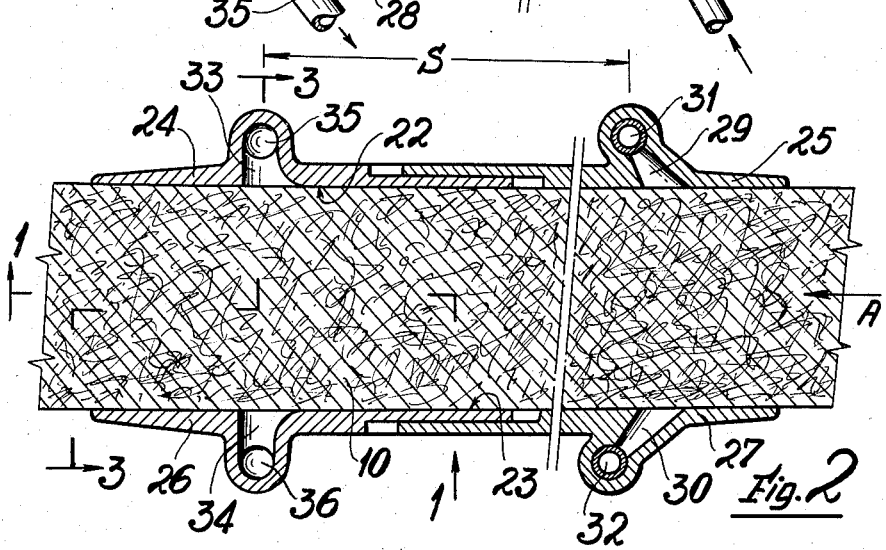
Figure 2 is a longitudinal sectional view taken along the line 2—2 of Fig. 1, of same apparatus, wherein the parts directly operating on the layer only are shown.
Figure 3:
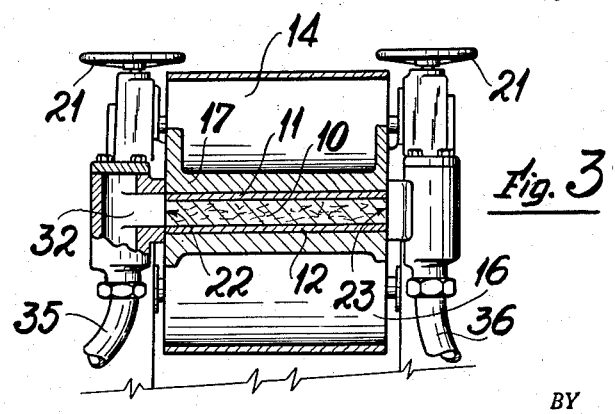
Figure 3 is a vertical transverse view of same apparatus, shown in the section and in the directions indicated by the arrows 3—3 in Fig. 2.
Figure 4:
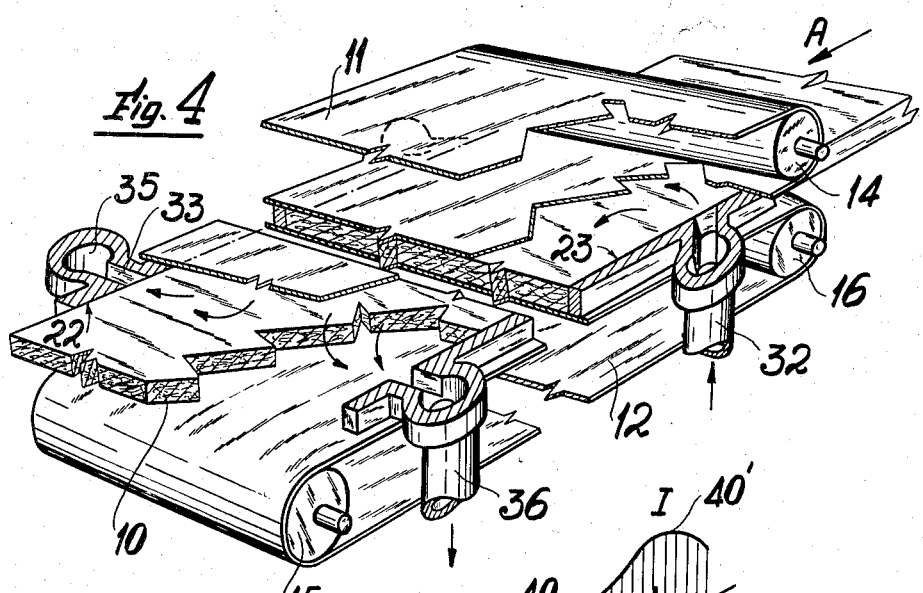
Figure 5:
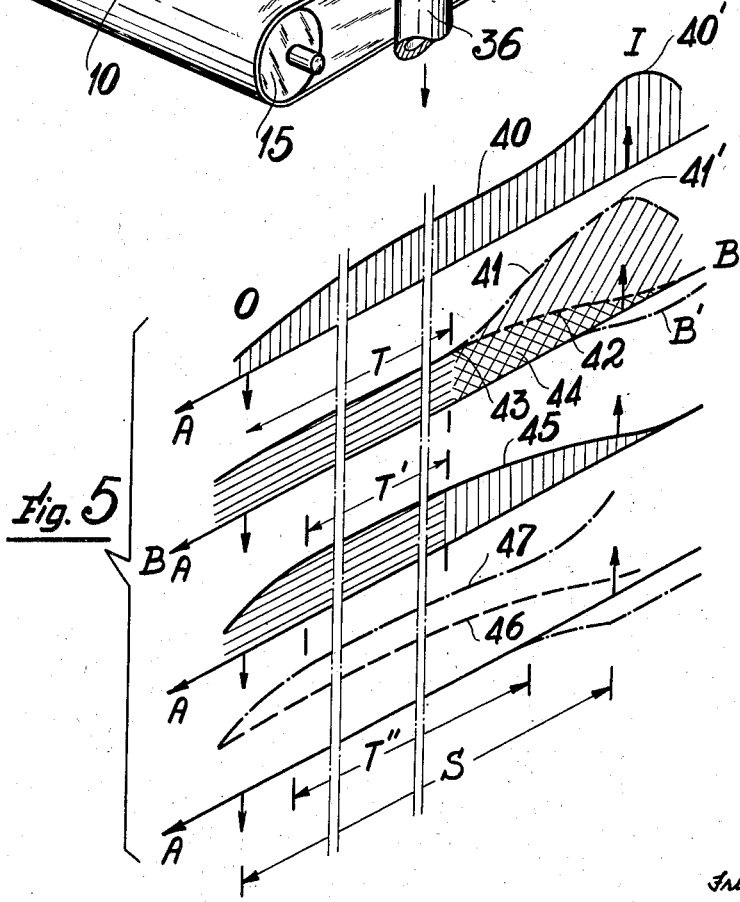

The matter of Figs. 4 and 5 is directed to make readily apparent the various phenomena which are produced according to the invention in the guide passage of an apparatus of the type shown in Figs. 1–3 in carrying out the method of the invention. In particular:

Figure 4 is an isometric view schematically illustrating the said apparatus, various parts of which are broken away;

Figure 5 is a multiple diagram referred to the said Fig. 4 and illustrating the variations of the several pressure and heat conditions which are produced along said guide passage, and the effects resulting therefrom; and Figure 6 is partly a side elevation and partly a vertical sectional view of another form of embodiment of the invention, as an apparatus designed for uninterrupted production of a compound material wherein the various components are symmetrically arranged and treated.

In the several figures illustrating the same and the various forms of embodiment of the invention, like reference numerals refer to like or respectively to equivalent parts or elements. In the said figures, in particular in the structures shown in Figs. 1–3 and 6, several structural elements and devices are omitted, to avoid useless complexity in the drawings and in consideration that any omitted detail does not constitute new and claimed matter, and that it appertains to common knowledge in the art. For example, in said figures the various power and transmission means, the valve means, certain elements of the frame structures, the most of piping, control means, gauges and other elements and devices which may be arranged according to common knowledge are omitted.

Referring first to Figs. 1–3: in an apparatus produced according to the invention a layer or mat 10 of fibrous material, say of fiber glass wool, previously saturated with a binding agent, preferably with a liquid thermo-setting binder, say a phenolic glue in water, for example, may be continuously moved, say in direction A (Fig. 2) between and by two conveyor bands 11 and 12, carried and revolved by pairs of rollers 13, 14 and 15, 16, respectively. Said conveyor bands are made of pliable and impervious material, say of steel band, or in a caterpillar-like form, wherein the hinged elements thereof are coated with an impervious material, say gas-proof impregnated fabric, cellophane and the like. Said conveyor bands 11 and 12 are caused to travel in the desired arrangement by guide plates 17 and 18, respectively. Said plates are supported by the frame structure 19 of the apparatus. Said guide plates may be made of impervious material, say of cast, and same plates may therefore co-operate to make impervious to gases the guide faces adapted to confine the surface portions of the layer of the fibrous material.

Further, the said conveyor bands may be constructed in a caterpillar form, and consisting in a plurality of hinged, parallel and spaced bars or elements, as known in the art, forming toothed guide faces adapted to correspondingly shaping the said surface portions of the layer passed therebetween. In such case the imperviousness of the said guide faces may be given by the same plates 17 and 18 and/or by a pliable material, say a steel sheet, or a plastic film, applied to said caterpillar devices, outside its said hinged elements in respect to the layer contacting therewith. A corrugated pliable steel sheet is made use of for producing the contacting surfaces of said conveyor bands too, if desired.

At its side or edge portions the said mat or layer 10 of fibrous material is confined between a pair of oppositely located minor guide faces 22 and 23, formed for example by members 23, 24 and respecttvely 25, 26, wherein the said members 23 and 25 are longitudinally movable in respect to members 24 and respectively 26, for the adjusting purpose described below. The inner surfaces (in respect to mat 10) of the said conveyor bands 11 and 12 and the said minor guide faces 22 and 23 actuate, in the described relative arrangement and combination thereof, the guide passage wherein a substantial length portion of the said mat or layer is confined and continuously moved in one direction, the said conveyor bands actuating the means designed for having said mat or layer moved in said guide passage.

The cross-section of said guide passage therefore defines the cross-sectional shape of the material treated and produced within and by the apparatus according to the invention. For the purpose of making the said apparatus capable of production of materials of the character described, of differing thickness, means are provided for variation of the spacing between the said conveyor bands 11 and 12 at the guide face forming portions thereof. For example, the upper conveyor band 11, its plate 17 and the rollers 13 and 14 may be supported by an upper frame structure 20 (Fig. 1) movably supported on the main frame structure 19, any conventional means, controlled by hand-wheels 21, for example, may be made use of for leveling the said upper frame structure. The provision of independent means adapted for raising and lowering the said upper frame structure 21 at its end portions comprising said rollers 13 and respectively 14 may be advantageously made use of for having the spacing between the guide faces progressively reduced or increased along the said formed guide passage. For example, supposing that the mat is continuously moved in direction A (Fig. 2), by adjusting the described apparatus so that the spacing between the conveyor bands at the position located between rollers 13 and 15 is less than the spacing between rollers 15 and 16, a progressive mechanical compression of the mat 10 moved between and by the said conveyor bands 11 and 12 may be obtained.

Any suitable source of motive power, say a motor 28 (Fig. 1) and any suitable reducing transmission means may be used for having the said conveyor bands 11 and 12 continuously moved at the desired linear speed. Any conventionally constructed suitable gear box or other transmission means adapted to modify the said linear speed may be made use of for adjusting the speed of the fed mat, in consideration of the required time of treatment of said mat within the said guide passage.

According to the invention, inlet opening means and outlet opening means are provided at spaced points of the said minor or edge guide faces 22 and 23 of the said guide passage, while said major guide faces of same passage is made, as above described, such to prevent any escaping of gases through the surfaces of the mat.

In the form of embodiment shown in Figs. 1–3 the said inlet opening means consist of a pair of symmetrically arranged nozzles 29 and 30, positioned on said guide faces 22 and 23, respectively, fed by pipings 31 and 32, respectively, connected to a suitable source (not shown) of the required heated and gaseous medium under pressure for example, of over-heated and steam under pressure, or of hot air under pressure, for example. The said outlet openings means consist in a second pair of passages 33 and 34, connected to exhaust pipings 35 and respectively 36, and symmetrically arranged at points of the said minor guide faces 22 and 23, respectively.

The said inlet nozzles 29 and 30 are staggered with respect to said outlet passages 33 and 34 in longitudinal direction along said guide faces so that a longitudinal spacing S is comprised between the points at which the gaseous medium is blown inside the fibrous material of mat 10 and the points wherein the same gaseous medium from the said mat may be received by direct expansion and escaping of said medium or, if convenient or required, suitable vacuum or sucking means (not shown) may be connected to said pipings 35 and 36 for drawing out said medium from said mat. The described construction of said edge guide faces 22 and 23 by means of longitudinally relatively movable members 24, 25 and 26, 27, respectively, may be made use of for having the said spacing S modified at will, within certain practical limits.

The several phenomena which are reasonably supposed to develop within the said guide passage will be readily understood by a consideration of the diagrams of Fig. 5, which are arranged in the accompanying drawing below the Fig. 4 wherein the described apparatus is isometrically and schematically shown in its operative elements only, for direct reference of the variations of heat and pressure to the various points of the said guide passage.

Fig. 5 is a diagram showing a multiple graph representing variations taking place during the passage of the gaseous medium from point I of the inlet means to the point O of the outlet means, i. e. during its passage along the said guide passage at the portion thereof defined by said spacing S.

The various curves of the graphs are therefore representative of the said variations at differing positions of said spacing. The time during which the material, say the binding agent, is subject to the action of heat and pressure, is a function of the speed at which any point of the fibrous material travels from I to O. Said speed is obviously very little in respect to the speed at which the molecula of the gaseous medium travel between and inside the fibrous material and, therefore, the motion of said material may be disregarded but in few very exceptional case in analyzing the said phenomena, without prejudice of correct understanding thereof. Further, the said gaseous medium cannot obviously be exactly confined to travel in the very spacing S, but it expands outside said spacing, i. e. before point I and after point O, in respect to a supposed direction A of motion of the mat 10. In consideration of the fact that sharp pressure drops occur outside of spacing S, the actions exerted by said gaseous medium outside said spacing S may be disregarded too. In the said graphs of Fig. 5 the said curves are extended a little outside said spacing S for making apparent said drops, but in the practical field of application of the method according to the invention it has been found that the effective action of gaseous medium in the guide passage may be considered as effectively limited within the said spacing.

Curve 40 of the upper or first graph of Fig. 5 is a merely theoretical representation of the variation of the pressure of the gaseous medium in the spacing S, supposing that its temperature does not vary according to the variation of heat condition, as an hypothesis. Such supposed pressure from its highest value at 40', where the gaseous medium is blown through the inlet means into the mat, fastly drops to an average value from which a very slow decreasing occurs, due to the practical uniform resistance caused by the fibrous structure to be traveled by a gas.

Curves 4 and 42 of the second graph of Fig. 5 are representative of the variations of the heat conditions of the gaseous medium and respectively of fibers of the fibrous material, in respect to a base line B—B which represent the temperature of the said fibers as same are fed in the guide passage and before the contact thereof with the gaseous medium. The temperature of the gaseous medium gets obviously highest value at 41' wherein it is blown in the mat, and wherein no heat is yet transferred to the fibers. Said temperature of the gaseous medium decreases until point 43 is reached, while the temperature of the fibers increases until same point 43, owing to the heat transferred from the said gaseous medium to the fibers. At said point 43 the balance of the heat conditions of gaseous medium and of fiber is reached. The loss of heat through the guide passage's walls (which may be provided with heat insulating means) is very little and it may be disregarded. The temperature of the compound and not homogeneous mass, formed by the fibrous material and by the gaseous medium saturating the spacing between the fibers thereof, may be therefore considered as a constant of value 43 during a substantial portion T of the travel of the said gaseous medium along the spacing S. The crisscross hatched area 44 of said second graph is representative of the amount of the heat transfererd from the gaseous medium to the fibers of the fibrous material. Owing to the fact that the mass and the cross-section of any single fiber is very little in respect to its surface, the length of portion T of said spacing S is substantial and largely prevailing in respect to the whole length of said spacing.

The curve 45 of the third graph of Fig. 5 is representative of the variation of the pressure due to the effect and to the variations of the temperature of the said compound mass "gaseous medium-fibers," owing to the fact that the heat carried by said gaseous medium in the guide passage causes the air and other gases already comprised in the mass to expand and, particularly, it causes the liquid substance and the solvent of the binding agent or agents to evaporate. Such resulting pressure is varied therefore in accordance with said temperature of the fibers. Accordingly, the first portion of the curve 45 substantially follows the shape of the curve 42 of the second graph. The said resulting pressures reach and maintain a substantially constant value in the portion of spacing S corresponding to the said portion T, except in the part thereof near to outlet means at O, wherein the said pressure drops, owing to the escaping of the gases through said outlet means. The said pressure may therefore be considered as a constant during a substantial portion T' of said portion T of the spacing S.

In the fourth and lowest graph of Fig. 5 the curves 46 and 47 are representative of the final conditions and variations of temperature and respectively of pressure resulting by the combined effects of the above analyzed phenomena. From said fourth graph it will readily be understood that in a substantial portion T" of the spacing S, comprised in said guide passage, the traveling fibrous material and the binding agent or agents carried thereby are subject to a substantially high and uniform heat and compression conditions particularly adapted and advantageous for the development of the drying and setting steps of the said agents. In particular said conditions are advantageously adapted for the setting of binding agents of the polymerizable and thermo-setting type, say of Bakelite or phenolic glues, for example, polyesters and the like.

As above said, the time during which the material is subject to the above analyzed conditions of heat and pressure is a function of the speed at which the said material travels along and within the said guide passage of the apparatus, and more particularly said time of treatment corresponds to the time during which any given point of the fibrous material travels along the said portion T". By constructing the said apparatus of a substantial length, a large production of the material considered may be obtained, owing to the noticeable speed that may be imparted to the fed material. By modifying the said spacings S (by relatively moving the said members 24 and 26 of Fig. 2 in respect to the 25 and 27, respectively) the said time of treatment may be correspondingly modified, and a further adaptation to differing conditions and requirements of production may be obviously attained by modifying the linear speed of the material within the apparatus.

By the described arrangement of the said inlet means and outlet means at spaced points of the said side guide faces 22 and 23 and by preventing the gaseous medium to escape through the major surfaces of the material, the described application of heat and pressure to the material is combined with a mechanical action exerted by said gaseous medium to the binding agent or agents before their setting, the said mechanical action being therefore applied and developed in the portion of spacing S, comprised between the point I of inlet means and the portion T" wherein the said setting is finally accomplished.

Owing to the fact that the speed of the molecula of the gaseous medium is greater in the middle portion of the thickness of the mat and less near to the major surfaces thereof (through which said medium cannot expand), the yet not set binding agent or agents are caused to condense near said surfaces on the guide faces confining same. Such condensation may be made use of either for producing a crust-like coating of condensed binding agent on said major surfaces, or for producing an effective adhesive connection or a fusing of the fibrous material with other sheet or panel material applied to said surfaces and moved together with the fibrous material. In the case that said condensed binding agent or agents require an extra-amount of heat for its setting (owing to said its own condensed condition) the guide faces of the apparatus may be adapted to furnish said extra-amount of heat, by providing the described plate members 17 and 18 with heating means (not shown), with electric resistors or by a circulation of over-heated steam, for example.

By a construction and by a mode of operation as above, it will be therefore possible the uninterrupted production of a rigid, self-sustaining panel-like material, which may be cut into plates, panels, strips and the like as it is fed outside the apparatus, wherein a core or inner portion of light fibrous material is made integral at its major surface with an harder coating. By proper relations between the amount of the binding agent added to the fibrous material, the various heat and pressure conditions, and the time of passage of the mass through the said guide passage, the production of a fibrous material having smooth and imperivous crust-like major surfaces is made possible.

In the case that the use of thermo-plastic binding agents is desired or required, say of chloride of polyvinyl, polystyrolic resins and the like, the described heat and pressure conditions may be easily adapted to produce the necessary fluidification of the agent and its correct distribution in any point of the fibrous material, together with its condensation near the major surfaces thereof. In such case the heat conditions along the guide passage must be made such to cause the said agent to set before the exit of the material from said guide passage.

The cooling down and the consequent setting of the thermo-plastic material is therefore prevailingly actuated in the portion of guide passage comprised between the outlet means and the end of said passage (in the direction of movement of the material). The said plate members 17 and 18 may be provided with cooling means (not shown) for example with a circulation of cold water, at their parts opposed to said portion.

As above said, the several analyzed phenomena are described with disregard of the direction of motion of the fibrous material, owing to the very little speed of such motion in respect to the speed of the motion of the gaseous molecula of the heat and pressure carrier medium. In the described graph of Fig. 5 the fibrous material is supposed to move in direction A, i. e. from point I of inlet means to point O of outlet means. In the case that the fibrous material is continuously moved in the guide passage in direction opposite to A, the curves 41 and 42 of the second graph will by slightly modified, owing to the fact that the heated gaseous medium is blown within a fibrous material the fiber of which are already heated during their prior passage along the spacing S. In such case the value represented by said curves will be substantially modified as the base line thereof should be modified as indicated by B'.

The described apparatus might be modified for example by providing same with two or more inlet means and/or with two or more outlet means spaced along any edge guide face 22 and 23. For example, a substantially symmetrical arrangement of said means may be provided, wherein the inlet nozzles are located substantially at midway of the guide passage while near both the end portions thereof two pairs of outlet means might be located. In such case the several phenomena illustrated by the graphs of Fig. 5 might be supposed symmetrical in respect to point I, but in the variation of the temperature of the fibers, which will have its lower value in the point of first contact of the fibers with the heated gaseous medium.

In the said Figs. 1–3 the described structures comprise a horizontally arranged guide passage. In such machine the weight of the materials and in particular of the not yet set binding agent or agents may prejudice the quite symmetrical distribution of said agent or agents if liquid. Specifically, in the production of hard surfaces by condensation of the binding agent, or in impregnating applied sheet materials with liquid agents, the lower surface might have a crust-like coating formed thereof which is noticeably thicker than the coating formed on the upper surface of the layer. A quite symmetrical treatment of the various materials may be obtained in an apparatus produced according to the invention and wherein the guide passage forming members are arranged to locate said passage in a vertical plane and to move the materials in one vertical direction.

In Fig. 6 an apparatus constructed according to the invention and comprising the said vertical arrangement of the guide passage forming members is shown. In the machine of Fig. 6 the fibrous layer 10 is upwardly moved between conveyor bands 11' and 12' forming the major guide faces of said guide passage, the minor or edge guide faces of which are formed by members 26', comprising the inlet means 30' and the outlet means 34', spaced by the spacing S and connected to the gaseous medium feeding piping 32 and to the exhaust piping 36, respectively. In the guide passage of the apparatus of Fig. 6 the several phenomena and steps are developed substantially as above described with reference to the graphs of Fig. 5 and in relation with the apparatus shown in Figs. 1–4. Such phenomena and steps will not therefore again be described.

It will be however readily understood that in an arrangement as shown in Fig. 6 not only the movements, the condensation and the distribution of the binding agents within the guide passage may develop in a symmetrical way in respect to both the major surfaces of the material, but also the draining of liquid substances will occur in a likewise symmetrical manner.

The said Fig. 6 illustrates further an apparatus provided with several means and devices adapted to perform and to complete any step and treatment of various not homogeneous materials in view of production of a new and advantageous compound material of the character referred to above.

In such apparatus the mat 10', say of pure fiber glass wool, is fed in direction C by a conveyor belt 50, for example, and above a guide means 51, in a bath 53 of liquid binding agent, means being provided, say a roller 52, for immersing said mat into said bath. As said mat is raised from said bath it is thoroughly wetted with an excess of said liquid binding agent, and the said excess may be removed from said mat by making use of an air blower device 54, for example; the excess liquid removed may be caused to drop again in the said bath 53.

In the case that the treatment comprises the application of polymerizable agents, other complemental substances may be added to the fibrous material and/or to the binding agent, say a catalyzing agent, as known in the art. Such addition may be performed for example by means of blower devices 55 and 56 fed through an injector 57 connected through suitable pipings 58 and 59 to a container (not shown) for said agent and respectively to a source (not shown) of pressurized air or other gas, for example.

Other corresponding devices may be provided and adapted for completing the said removal of excess of binding agent, and/or exerting any physical or chemical action which may be required or convenient for putting the fibrous material and the agent or agents comprised therein in the best preparatory conditions for the final treatment applied during the passage thereof in the said guide passage.

Further, a preliminary heating may be applied to the material by passing same through a heated chamber 60, for example, electrically heated by means of resistors 61, for example, or steam heated. Such preliminary treatment may be particularly useful in the case that a very thick fibrous layer is designed to be coupled to thinner sheet materials, in view of balancing the amount of heat to be added to the resulting compound mass during the said final treatment, for having said not homogeneous materials homogeneously treated.

The apparatus shown in Fig. 6 is specifically designed for mass production of a compound material wherein a thick core layer 10" of fibrous material, say of fiber glass wool, is coated with fabric-like sheet materials 61 and 62, say with textile glass fabric or net, at its major surfaces, to form very consistent surface portions thereabout, said surface portions being made hard and/or impervious by setting and condensation of a binding agent differing from the binding agent added into bath 53 to the said fibrous material of mat 10.

For example, the apparatus is provided with frame structures 63 and 64 on which bobbins 65 and respectively 66 are rotatably supported, the said materials 61 and 62 being progressively unwound from said bobbins and fed in the guide passage by same conveyor bands 11' and 12'. The said materials 61 and 62 may be impregnated with the said differing binding agent on wetting rollers 67 and 68, for example, said rollers being supported to rotate in contacting relationship with other rollers 69 immersed into baths 70 and respectively 71 wherein the said differing binding agent is contained. Means for removal of excess of said differing binding agent from said materials 61 and 62 may be further provided, said means consisting in blower or in scraper means, of conventional construction, and the like. Heating means may likewise be provided for a preliminary heating of said materials, if desired, and in general for any required preliminary treatment of the not homogeneous materials to be fed together in the guide passage for the simultaneous and homogeneous final treatment thereinto. In general, a preliminary heating will be applied to the material requiring a more extended heating treatment for completing the setting of its own binding agent, so that the treatment applied during the passage in the said spacing S will bring any passing material to its final desired shape.

Obviously, other agents may be applied and treated in an apparatus constructed according to the invention. In general, other substance adapted to improve the characteristics of the material to be produced may be added prior and/or during the several steps performed by said apparatus. For example, colouring substances, water-proof or water-repellent substances may be added; silicon resins and certain polyesters known in the art may be added to improve the electrically insulating character of the produced material. Further, substance adapted to increase the pressure in the guide passage may be added to the material, say certain well known foaming agents, which by developing gases at the temperature of the spacing S of the guide passage may improve the values represented by the third graph of Fig. 5.

For the production of materials the inner and prevailing portion of which consists in a layer of fiber glass wool, advantageous use may be made of the gaseous mediums and of the various heat and pressure conditions known in the art for the treatment of homogeneous layer of corresponding fibrous materials. In the specification of our said copending application Serial Number 461,576, filed October 11, 1954, several particulars about said gaseous mediums and said modes of treatment may be found.

It will be understood that each of the new elements described above, or any novel combination comprising two or more of the described elements, may also find a useful application in other types of apparatus for treating mats of fibrous material differing from the types described above.

While the invention has been illustrated and described in few specific embodiments, and more particularly as embodied in apparatus for treating a binding agent contained in one or more band-shaped layers of glass-wool by blowing a stream of a heated and pressurized gaseous medium through both a longitudinal and a transverse section of the layer, in a passageway impervious to the gases at its faces defining the major surfaces of said layer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications and for producing goods of type other than those described, without omitting features that, from the standpoint of prior art, fairly constitute essential characteristics of the generic or specific aspects of this invention and, therefore, such adaptations should and are intended to be comprehended within the meaning and range of equivalents of the following claims.

What we claim as new and desire to have protected by Letters Patent is:

1. A method for uninterrupted production of a layer of mineral wool wherein the fibers thereof are bound by a binding agent, comprising the steps of moving a continuous layer of mineral wool, having opposite major surfaces and edge surfaces, and saturated with a thermosetting binding agent; of passing said saturated layer through a guide passage having two oppositely located guide faces impervious to gases and adapted to confine the said major surfaces of said layer and having two oppositely located minor guide faces adapted to confine the said edge faces of said layer; of blowing against said edge surfaces at least a stream of an heat and pressure carrier gaseous medium through at least one inlet point of said minor guide faces; and of receiving said stream from said layer in at least one outlet point of said minor guide faces longitudinally spaced in respect to said inlet point so that the said stream is caused to travel within said layer through at least a longitudinal section and through at least a transverse section thereof and it is prevented to escape through said major surfaces, for condensing the said binding agent in the portions near to said major surfaces in respect to the inner portion of said layer and for setting said binding agent in said inner portion and in said portions near to said major surfaces to form a crust-like coating on said major surfaces.

2. A method for uninterrupted production of a layer of mineral wool wherein the fibers thereof are bound by a binding agent, comprising the steps of moving a continuous layer of mineral wool having opposite major surfaces and edge surfaces, in one direction; of saturating said layer with a thermosetting binding agent of passing said layer through a guide passage having two oppositely located guide faces impervious to gases and adapted to confine the said major surfaces of said layer and having two oppositely located minor guide faces adapted to confine the said edge faces of said layer; of blowing against said edge surfaces at least a stream of an heat and pressure carrier gaseous medium through at least one inlet point of said minor guide faces; and of receiving said stream from said layer in at least one outlet point of said minor guide faces so that the said stream is caused to travel within said layer through at least a longitudinal section and through at least a transverse section thereof and it is prevented to escape through said major surfaces for condensing the said binding agent in the portions near to said major surfaces in respect to the inner portion of said layer and for setting said binding agent in said inner portion and in said portions near to said major surfaces.

3. A method for uninterrupted production of a layer of mineral wool wherein the fibers thereof are bound by a binding agent, comprising the steps of moving a continuous layer of mineral wool, having opposite major surfaces and edge surfaces, and saturated with a binding agent; of passing said layer through a guide passage having two oppositely located guide faces impervious to gases and adapted to confine the said major surfaces of said layer and having two oppositely located minor guide faces adapted to confine the said edge faces of said layer; of blowing against said edge surfaces at least a stream of an heat carrier gaseous medium through at least one inlet point of said minor guide faces; and of receiving said stream from said layer in at least one outlet point of said minor guide faces so that the said stream is caused to travel within said layer through at least a longitudinal section and through at least a transverse section thereof and it is prevented to escape through said major surfaces, for condensing the said binding agent in the portions near to said major surfaces in respect to the inner portion of said layer; and of making said binding agent set in said inner portion and in said portions near to said major surfaces.

4. A method for uninterrupted production of a layer of mineral wool wherein the fibers thereof are bound by a binding agent, comprising the steps of moving a continuous layer of mineral wool, having opposite major surfaces and edge surfaces, in one direction; of saturating said layer with a thermosetting binding agent; of passing said layer through a guide passage having two oppositely located guide faces adapted to confine the said major surfaces of said layer and having two oppositely located minor guide faces adapted to confine the said edge faces of said layer; of blowing against at least one of said surfaces at least a stream of an heat and pressure carrier gaseous medium through at least one inlet point of said guide faces; and of receiving said stream from said layer in at least one outlet point of said guide faces and spaced from said inlet point so that the said stream is caused to travel within said layer through at least a section thereof, for setting said binding agent in said layer.

5. A method for uninterrupted production of an elongated band-shaped material of the type having an inner portion of mineral wool bound by a binding agent, comprising the steps of moving a continuous main layer of mineral wool having major and edge surfaces in one direction and at a given speed; of saturating said main layer with a thermosetting binding agent; of moving in same direction and at same speed other layers of material not homogeneous to the material of said main layer and located opposite and parallel to the said major surfaces of said main layer; of carrying said other layers in juxtaposed and pressed relationship with the major surfaces of said main layer to form a compound band-shaped material; of passing said compound band-shaped material into and along a guide passage having two oppositely located major guide faces adapted to confine the major surfaces of said compound material and made impervious to gases, and having two oppositely located minor guide faces adapted to confine the edge surfaces of said compound material; of blowing streams of an heated gaseous medium against the edge surfaces of said main layer through inlet points in the said minor guide faces; and of receiving said streams from said main layer through outlet points in said minor guide faces and spaced from said inlet points, so that the said streams are caused to travel through longitudinal and transverse sections of said main layer while the said gaseous medium is prevented to escape through the major surfaces of said compound material, for condensing the said binding agent near the said other layer, setting said agent and making the said other layers integral with the said main layer.

6. A method for uninterrupted production of an elongated band-shaped material of the type having an inner portion of mineral wool bound by a thermosetting binding agent comprising the steps of moving a continuous main layer of mineral wool, having major surfaces and edge surfaces, in one direction; of saturating said layer with a thermosetting binding agent; of continuously moving other layers of impervious material not homogeneous to the material of said main layer in same direction and located opposite and parallel to the said major surfaces of the said main layer; of carrying said other layers in adjacent, juxtaposed and pressed relationship with the major surfaces of said main layer to form a compound band-shaped elongated material; of passing said compound band-shaped material in a guide passage having two oppositely located major guide faces adapted to confine the major surfaces of said compound material, and having two oppositely located minor guide faces adapted to confine the edge surfaces of said compound material; of blowing streams of a pressurized and heated gaseous medium in the edge surfaces of said compound material within the said main layer through at least two oppositely located inlet points in the said minor guide faces; and of receiving said streams from said main layer through at least two oppositely located outlet points in said minor guide faces and spaced from the said inlet points, so that the said streams are caused to travel within said main layer through longitudinal and transverse sections thereof, for condensing the said binding agent near and against the said other layers, setting said agent and making the said other layers integral with the said main layer.

7. A method for uninterrupted production of an elongated band-shaped material of the type having an inner portion of mineral wool bound by a binding agent, comprising the steps of moving a continuous main layer of mineral wool having major and edge surfaces in one direction and at a given speed; of saturating said main layer with a binding agent; of moving in same direction and at same speed at least one other layer of material not homogeneous to the material of said main layer, and located opposite and parallel to one of the said major surfaces of said main layer; of saturating said other layer with a binding agent; of carrying said other layer in adjacent, juxtaposed and pressed relationship with said one major surface of said main layer to form a compound elongated band-shaped material; of continuously passing the said compound band-shaped material in and through a guide passage having two oppositely located major guide faces adapted to confine the major surfaces of said compound material and made impervious to gases, and having two oppositely located minor guide faces adapted to confine the edge surfaces of said compound material; of blowing at least one stream of a pressurized and heated gaseous medium in the edge surfaces of said main layer through at least one inlet point in the said minor guide faces; and of receiving said stream from said main layer through at least one outlet point in said minor guide faces and spaced from the said inlet point, so that the said stream is caused to travel within said main layer through longitudinal and transverse sections thereof and it is prevented to escape through the major surfaces of the said compound material, for condensing the said binding agents near the said other layer, setting said agents and making the said other layer integral with the said main layer.

8. A method for uninterrupted production of an elongated band-shaped material of the type having an inner portion of mineral wool bound by a thermosetting binding agent comprising the steps of continuously moving a continuous main layer of mineral wool, having major and edge surfaces, in one direction and at a given speed; of saturating said main layer with a thermosetting binding agent; of moving in same direction and at same speed other layers of material not homogeneous to the material of said main layer and located opposite and parallel to the said major surfaces of said main layer; of saturating said other layers with binding agents of like type; of carrying said other layers in juxtaposed and pressed relationship with the major surfaces of said main layer to form a compound band-shaped material; of passing said saturated compound band-shaped material into and along a guide passage having two oppositely located major guide faces adapted to confine the major surfaces of said compound material and made impervious to gases, and having two minor guide faces adapted to confine the edge surfaces of said compound material; of blowing streams of a pressurized and heated gaseous medium into the edge surfaces of said main layer through at least two oppositely located inlet points in the said minor guide faces; and of receiving said streams from said main layer through at least two oppositely located outlet points in said minor guide faces and spaced from the said inlet points, so that the said streams are caused to travel within said main layer through at least one longitudinal section and at least one transverse section thereof while the said gaseous medium is prevented to escape through the major surfaces of said compound material, for condensing a part of the said binding agents into and near the said other layers, setting said binding agents and making the said other layers integral with the said main layer.

9. A method for uninterrupted production of an elongated band-shaped material of the type having an inner portion of mineral wool bound by a thermosetting binding agent, comprising the steps of moving a continuous main layer of mineral wool having major and edge surfaces, in one direction and at a given speed; of saturating said main layer with a first thermosetting binding agent; of moving in same direction and at same speed other layers of material not homogeneous to the material of said main layer, and located opposite and parallel to the said major surfaces of said main layer; of saturating said other layers with other thermosetting binding agents differing from said first binding agent in respect to the time of heating required for completely setting same; of preliminarily heating the layers saturated with the binding agent requiring a longer time to set for partially set said binding agent until its setting may be completed by a heating treatment corresponding to the complete heating treatment adapted to set the binding agent requiring a shorter time to set; of carrying the said other layers in juxtaposed and pressed relationship with the major surfaces of said main layer to form a compound band-shaped material; of passing said saturated compound band-shaped material in a guide passage having two oppositely located major guide faces adapted to confine the major surfaces of said compound material and made impervious to gases, and having two minor oppositely located guide faces adapted to confine the edge surfaces of said compound material; of blowing streams of a pressurized and heated gaseous medium in the edge surfaces of said main layer through at least two oppositely located inlet points in the said minor guide faces; and of receiving said streams from said main layer through at least two oppositely located outlet points in said minor guide faces and spaced from the said inlet points, so that the said streams are caused to travel within said main layer through at least a longitudinal section and through at least a transverse section thereof while said gaseous medium is prevented to escape through the major surfaces of said compound material, for prevailingly condensing the said binding agents into and near the said other layers, completing the setting of all said binding agents and making the said other layers integral with the said main layer.

10. In an apparatus for producing an elongated band-shaped layer having an inner portion of fibrous material wherein the fibers thereof are bound by a binding agent, in combination: a guide passage having guide faces adapted to confine the major surfaces and edge surfaces of a mat of fibrous material; means for moving a mat of fibrous material saturated with a not set binding agent in one longitudinal direction through said guide passage; at least one inlet means opening on at least one of said guide faces for blowing a stream of an heated gaseous medium through one of said edge surfaces into the said mat of saturated fibrous material; and at least one outlet means opening on one of said guide faces, located in longitudinally spaced relationship with the said inlet means for receiving the stream of gaseous medium after the same has passed through at least one longitudinal section and at least through one transverse section of said saturated mat and has carried and condensed a part of said binding agent near to at least one of said guide faces.

11. In an apparatus for producing an elongated band-shaped layer having an inner portion of fibrous material wherein the fibers thereof are bound by a binding agent, and having two parallel elongated major surfaces, in combination: a guide means passage having guide faces adapted to confine major and edge surface portions of a mat of fibrous material; means for moving a mat of fibrous material saturated with a not set binding agent in one longitudinal direction through said guide passage; inlet means openings on the guide faces confining the edge portions of the mat for blowing a stream of an heated gaseous medium into the said mat of saturated fibrous material at at least a pair of oppositely located first points on its edge portions; means for making impervious to gases the guide faces confining the major surfaces of the mat for preventing the said gaseous medium to escape through said major surfaces; and outlet means openings on the guide faces confining the said edge portions of mat, at at least a pair of oppositely located other points on its edge portions and in longitudinally spaced relationship with said first points for receiving the stream of gaseous medium after the same has passed through longitudinal and transverse sections of said saturated mat and has carried and condensed a part of said binding agent at and near said major surface portions.

12. In an apparatus for producing an elongated band-shaped layer having an inner portion of fibrous material wherein the fibers thereof are bound by a binding agent, and having two parallel elongated major surfaces and edge surfaces, in combination: a vertically arranged guide means passage having guide faces adapted to confine major and edge surface portions of a continuous mat of fibrous material; means for longitudinally moving a mat of fibrous material saturated with a not set binding agent in one vertical direction through said guide passage; inlet openings on the said guide faces for blowing a stream of an heated gaseous medium into the said mat of saturated fibrous material at first points on its edge portions; means for making impervious to gases the guide faces confining the major surfaces of the mat for preventing the said gaseous medium to escape through the said major surfaces; and outlet openings on the said guide faces at other points on the edge portions of the mat in longitudinally spaced relationship with said first points for receiving the stream of gaseous medium after the same has passed through longitudinal and transverse sections of said saturated mat, vertically travelling thereinto, and it has carried and condensed symmetrically a part of said binding agent at and near the said major surface portions of the mat.

13. In an apparatus for uninterrupted production of an elongated band-shaped compound material having an inner portion of mineral wool and two elongated major surface portions of sheet material not homogeneous to mineral wool, in combination: a guide means passage having major guide faces adapted to confine the major surface portions and side guide faces adapted to confine the edges of said compound material; means for moving in one longitudinal direction and at a given linear speed a mat of mineral wool saturated with a not set binding agent; means for moving in same direction and at same speed said sheet material; means for bringing said sheet material in juxtaposed and pressed relationship with the major surface portions of said mat; means for longitudinally moving said juxtaposed and pressed sheet material and mat together through said guide means passage; inlet means opening on the said side guide faces for blowing a stream of heated gaseous medium into said saturated mat of mineral wool through the edges of said compound material wherein said mat is not covered by said juxtaposed sheet material; means for making impervious to gases the said major guide faces for preventing the said gaseous medium to escape through said elongated major surface portions of said compound material; and outlet means opening on the said side guide faces and located at a longitudinally spaced relationship with the said inlet means opening for receiving the stream of said gaseous medium from the edges of said compound material after the said gaseous medium has passed through longitudinal and transverse sections of said saturated mat of mineral wool and it has carried and condensed a part of said binding agent against the said juxtaposed sheet material.

14. In an apparatus for uninterrupted production of an enlongated band-shaped compound material having elongated major surfaces and edge surfaces, formed by an inner portion of mineral wool and by major surface portions of sheet material not homogeneous to mineral wool and made integral therewith, in combination: a guide means passage having major and side guide faces adapted to confine longitudinal portions of said major and respectively of said edge surfaces of the compound material; means for saturating with a bonding agent a continuous mat of mineral wool adapted to form said inner portion of said compound material; means for saturating with a bonding agent two continuous bands of sheet material adapted to form said major surface portions of said compound material; means for carrying said two bands of sheet material in juxtaposed and pressed relationship with the major surfaces of said mat; means for continuously moving said saturated, juxtaposed and pressed mat and sheet materials together longitudinally through said guide passage in one direction; inlet means opening on the said side guide faces at at least a pair of oppositely located first inlet points for blowing streams of heated and pressurized gaseous medium into said saturated mat of mineral wool through the edge surfaces of said compound material wherein said mat is not covered by said juxtaposed sheet materials; means for making impervious to gases the said major guide faces for preventing the said gaseous medium to escape through said elongated major surfaces of said compound material; and outlet means opening on said side guide faces at at least a pair of oppositely located other outlet points longitudinally spaced from said first points for receiving the streams of said gaseous medium through the edge surfaces of said compound material after the said gaseous medium has passed through longitudinal and transverse sections of said saturated mat of mineral wool, transferred heat to said binding agents and set said agents into said mat and said sheet materials, making same relatively integral.

References Cited in the file of this patent

UNITED STATES PATENTS

| | | |
|---|---|---|
| 1,990,554 | Libberton | Feb. 12, 1935 |
| 2,324,787 | Lundgren | July 20, 1943 |
| 2,457,784 | Slayter | Dec. 28, 1948 |
| 2,592,470 | Ryberg | Apr. 8, 1952 |
| 2,655,458 | Collins | Oct. 13, 1953 |
| 2,698,271 | Clark | Dec. 28, 1954 |
| 2,736,362 | Slayter et al. | Feb. 28, 1956 |

FOREIGN PATENTS

| | | |
|---|---|---|
| 703,023 | Great Britain | Jan. 27, 1954 |
| 989,887 | France | May 30, 1951 |
| 1,054,103 | France | Oct. 7, 1953 |
| 1,069,103 | France | Feb. 10, 1954 |